2,908,707

DIALKYL S(1,3,3-TRIALKOXYPROPYL) PHOSPHOROTHIOLOTHIONATES

Marvin A. McCall and Harry W. Coover, Jr., Kingsport, Tenn., assignors to Eastman Kodak Company, Rochester, N.Y., a corporation of New Jersey No Drawing. Application December 5, 1957
Serial No. 700,763

6 Claims. (Cl. 260—461)

This invention relates to new organophosphorus compounds and to their method of preparation. In a specific aspect this invention relates to the preparation of new organophosphorus compounds by the reaction of dialkyl phosphorothiolothionates with trialkoxypropenes and to the products of this process.

Organophosphorus compounds have evidenced marked utility and importance in many fields. For example, they have been employed as insecticides, fungicides, pesticides and in related uses. Consequently, it is of considerable importance to discover new and useful organophosphorus compounds and to have process for the production of such organophosphorus compounds. Therefore, it is an object of this invention to provide new and useful organophosphorus compounds. It is another object of this invention to provide a novel method for preparing the new and useful organophosphorus compounds. It is still another object of this invention to provide new and valuable insecticides that can be used in various insecticidal compositions.

In accordance with this invention it has been found that new organophosphorus compounds, useful as insecticides, can be prepared by reacting certain phosphorothiolothiomates with trialkoxypropenes. The new products of this invention have the structural formula:

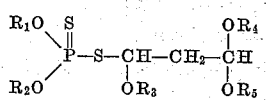

wherein $R_1$ and $R_2$ are selected from the group consisting of lower alkyl radicals containing 1 to 4 carbon atoms, haloalkyl (chloroethyl, chloropropyl, trichloroethyl, and the like) radicals containing 1 to 4 carbon atoms, alkoxyalkyl (methoxymethyl, methoxyethyl, methoxypropyl, and the like) radicals wherein the alkoxy and alkyl groups contain 1 to 4 carbon atoms, and $R_3$, $R_4$ and $R_5$ are alkyl groups containing 1 to 2 carbon atoms. When the number of carbon atoms in $R_3$, $R_4$ and $R_5$ is more than 3, the insecticidal activity of product is decreased.

The compounds of this invention are prepared by reacting a phosphorothiolothionate having the structural formula:

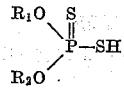

wherein $R_1$ and $R_2$ are as defined above with a trialkoxypropene having the structural formula:

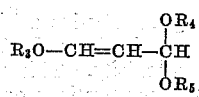

wherein $R_3$, $R_4$ and $R_5$ are as defined above.
In the practice of this invention we prefer to add one of the reactants gradually to a reactor containing the other reactant. For example, the trialkoxypropene can be added gradually to a reactor containing the phosphorothiolothionate reactant. Alternatively however, the reverse procedure of addition of reactants can be used and the phosphorothiolothionate reactants can be added to a reactor containing the trialkoxypropene. Normally it is desirable to employ a reactor provided with adequate means of agitation and, since the reaction is quite exothermic, it is also desirable to employ a reactor that is provided with adequate cooling means.

The operable temperature range for the reaction is generally from —25 to 150° C. and the preferred temperature range is from 25 to 100° C. However, it will be realized that in some instances temperatures outside this range can be employed. The reaction time usually varies from 0.5 to 8 hours, but longer and shorter reaction periods are sometimes used. Normally it is unnecessary to employ a catalyst for the reaction since the phosphorothiolothionate will react with the trialkoxypropene in the absence of a catalyst. If it is considered desirable to employ a catalyst, there are certain catalysts that can be used. For example, the tertiary amines, such as triethyl amine, and the like, can be used.

Ordinarily, it is not necessary to employ a solvent for the reaction but in some instances solvents are desirable. Among the solvents that can be used are normally liquid aliphatic and aromatic hydrocarbons such as pentane, heptane, octane, benzene, toluene, the xylenes and the like, chlorinated derivatives of the above-mentioned hydrocarbons as well as the common ether and ester solvents. It is preferable to carry out the reaction using equimolar quantities of the reactants, but the ratio of reactants is subject to wide variation.

The phosphorothiolothionate reactants that are used in our invention can be prepared by the known reaction of 4 moles of an aliphatic alcohol with one mole of phosphorus pentasulfide. The trialkoxypropenes can be prepared by the pyrolysis of the 1,1,3,3-tetralkoxypropanes which in turn can be prepared from malonaldehyde and the appropriate alcohol. Trimethoxypropene is available commercially.

The following examples are illustrative of the compounds within the scope of this invention, their method of preparation and their utility as insecticides.

EXAMPLE 1

*O,O-diethyl S-(1,3,3-trimethoxypropyl) phosphorothiolothionate*

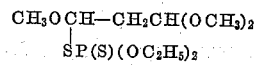

O,O-diethyl phosphorothiolothionate (0.1 mole) was added dropwise to 1,3,3-trimethoxypropene (0.1 mole) with stirring. The reaction was exothermic and the temperature rose to about 45° C. After the addition was complete and the temperature had dropped to room temperature, the reaction was heated on a steam bath for 15 minutes. The product was an oil, $n_D^{20}$ 1.4845.

EXAMPLE 2

*O,O-dimethyl S-(1,3,3-trimethoxypropyl) phosphorothiolothionate*

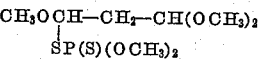

O,O-dimethyl phosphorothiolothionate (0.1 mole) was reacted with 1,3,3-trimethoxypropene (0.1 mole) in the same manner as described in Example 1. The product was an amber colored oil, $n_D^{21}$ 1.4890.

EXAMPLE 3

O,O-bis(2,2,2-trichloroethyl) S-(1,3,3-trimethoxypropyl) phosphorothiolothionate

$$\text{CH}_3\text{OCH}-\text{CH}_2-\text{CH}(\text{OCH}_3)_2$$
$$|$$
$$\text{SP(S)(OCH}_2-\text{CCl}_3)_2$$

O,O-bis(2,2,2-trichloroethyl) phosphorothiolothionate (0.1 mole) was reacted with 1,3,3-trimethoxypropene (0.1 mole) in the same manner as described in Example 1. The product was a dark brown oil, $n_D^{21}$ 1.5175.

EXAMPLE 4

O-ethyl, O-methyl S-(1,3,3-trimethoxypropyl) phosphorothiolothionate

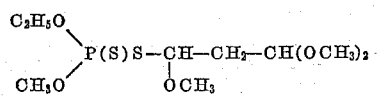

O-ethyl, O-methyl phosphorothiolothionate (0.1 mole) was added to 1,3,3-trimethoxypropene (0.1 mole) dissolved in 25 cc. of dry benzene containing 4 drops of triethyl amine as catalyst. After the addition was completed the mixture was heated on a steam bath for 15 minutes. The reaction mixture was then vacuum stripped to remove the benzene solvent and any other volatile impurities. The product remaining was a dark oil, $n_D^{20}$ 1.4860.

EXAMPLE 5

O,O-bis(2-chloroethyl) S-(1,3,3-triethoxypropyl) phosphorothiolothionate

$$(\text{ClCH}_2-\text{CH}_2\text{O})_2\text{P(S)S}-\text{CH}-\text{CH}_2-\text{CH}(\text{OC}_2\text{H}_5)_2$$
$$|$$
$$\text{OC}_2\text{H}_5$$

O,O-bis(2-chloroethyl) phosphorothiolothionate (0.1 mole) was reacted with 1,3,3-triethoxypropene (0.1 mole) under the same reaction conditions as described in Example 1. The product was a brown oil.

EXAMPLE 6

O,O-bis(2-methoxyethyl) S-(1,3,3-triethoxypropyl) phosphorothiolothionate

$$(\text{CH}_3\text{OC}_2\text{H}_4\text{O})_2\text{P(S)S}-\text{CH}-\text{CH}_2-\text{CH}(\text{OC}_2\text{H}_5)_2$$
$$|$$
$$\text{OC}_2\text{H}_5$$

O,O-bis(2-methoxyethyl) phosphorothiolothionate (0.1 mole) was reacted with 1,3,3-triethoxypropene (0.1 mole) in the same manner as described in Example 1. The product was an amber colored oil.

EXAMPLE 7

O,O-diethyl S-(1-methoxy - 3,3 - diethoxypropyl) phosphorothiolothionate

$$(\text{C}_2\text{H}_5\text{O})_2\text{P(S)S}-\text{CH}-\text{CH}_2-\text{CH}(\text{OC}_2\text{H}_5)_2$$
$$|$$
$$\text{OCH}_3$$

This compound was prepared from 0.1 mole of O,O-diethyl phosphorothiolothionate and 0.1 mole of 1-methoxy-3,3-ethoxy propene in the same manner as described in Example 1. The 1-methoxy-3,3-diethoxy propene was prepared by the same general method as is used for preparing the trimethoxy or triethoxypropenes except that the starting material was a mixed ethylmethyl acetal of malonaldehyde.

EXAMPLE 8

*Use of compounds as insecticides.*—Tests against mites were carried out in the following manner. Acetone solutions containing 1% of the candidate compounds were prepared and diluted with water to give solutions of the desired concentration for testing. Two heavily infested bean leaves containing adult two-spotted mites (*Tetranychus bimaculatus* Harvey) were carefully dipped in the above solutions and dried in a gentle air steam. The leaves were then placed on damp paper toweling in Petri dishes and observed after 24 hours for mortality among the adult mites. The percentage of the insects killed by different concentrations (parts per million) of toxicant can then be calculated; however, for comparison purposes it is more convenient to calculate the concentration of toxicant needed to kill 85% of the test insects. This concentration in parts per million is known as the minimum lethal dose required to kill 85% of the test insects and is abbreviated LD 85. The toxicity data for the compounds of this invention are given below in Table 1. The toxicity data for several simple ether or acetal derivatives are given in Table II. By comparison it can be seen that 1,3,3-trialkoxypropyl phosphorothiolothionates are some 4–10 times as active as the type disclosed in the prior art and therefore the compounds of this invention are not only different structurally but also unexpectedly several times more active. It should be noted that tests using acetone-water solutions (containing none of the toxicant) kill none of the mites.

TABLE I

| Toxicant | LD 85 in p.p.m. for mites |
| --- | --- |
| 1. O, O-Diethyl S-(1, 3, 3-trimethoxypropyl) phosphorothiolothionate (Ex. 1). | 9. |
| 2. O, O-Dimethyl S-(1, 3, 3-trimethoxypropyl) phosphorothiolothionate (Ex. 2). | 9. |
| 3. O-Ethyl, O-methyl S-(1, 3, 3-trimethoxypropyl) phosphorothiolothionate (Ex. 4). | 12. |

In like manner the other compounds of Examples 3, 5, 6, and 7 were found to have a very high order of miticidal activity. These compounds are also active aphicides, for example the product from Example 1 had an LD 85 of 20 p.p.m. for aphids.

TABLE II

| Toxicants of the Acetal Type | LD 85 in p.p.m. for mites |
| --- | --- |
| 1. O, O-Diethyl S-[1-(diethoxymethyl) ethyl] phosphorothiolothionate.<br>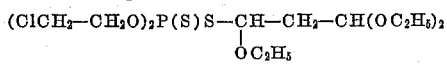 | 85. |
| 2. O, O-Diethyl S-[1-(diethoxymethyl) propyl] phosphorothiolothionate. | >100. |

| Toxicants of the Ether Type | |
| --- | --- |
| 1. O, O-Diethyl S-(1-ethoxy-2-methyl) propyl phosphorothiolothionate (distilled analytical sample).<br>$(\text{CH}_3)_2\text{CH-CH-OC}_2\text{H}_5$<br>$\quad\quad\quad\quad\quad\quad\mid$<br>$\quad\quad\quad\quad\quad\text{SP(S)(OC}_2\text{H}_5)_2$ | >100 (no kill at 100 p.p.m.). |
| 2. O, O-Diethyl S-(1-butoxy-2-methyl) propyl phosphorothiolothionate.<br>$(\text{CH}_3)_2\text{CH-CH-O(CH}_2)_3\text{CH}_3$<br>$\quad\quad\quad\quad\quad\quad\mid$<br>$\quad\quad\quad\quad\quad\text{SP(S)(OC}_2\text{H}_5)_2$ | 38. |
| 3. O, O-Diethyl S-[1-(2-chloroethoxy) ethyl] phosphorothiolothionate.<br>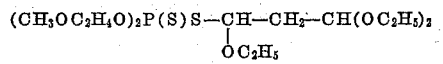 | 90–100. |
| 4. O, O-Diethyl S-(1-methyl-2-vinyloxy) ethyl phosphorothiolothionate.<br>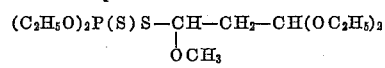 | 70. |

In addition to being an effective aphicide and miticide the compound produced in Example 1 has been found to possess mammalian toxicity. This compound is toxic to rats when used in concentrations of from 250 to 500 mg./kg.

We claim:
1. Organophosphorus compounds having the structural formula:

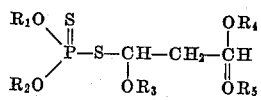

wherein $R_1$ and $R_2$ are selected from the group consisting of lower alkyl, lower haloalkyl and lower alkoxyalkyl and $R_3$, $R_4$ and $R_5$ are alkyl radicals containing 1 to 2 carbon atoms.

2. As a composition of matter, O,O-diethyl S-(1,3,3-trimethoxypropyl) phosphorothiolothionate having the formula:

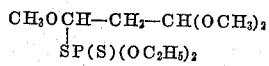

3. As a composition of matter, O,O-dimethyl S-(1,3,3-trimethoxypropyl) phosphorothiolothionate having the formula:

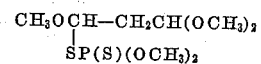

4. As a composition of matter, O,O-bis(2,2,2-trichloroethyl) S-(1,3,3-trimethoxypropyl) phosphorotholothionate having the formula:

5. As a composition of matter, O-ethyl, O-methyl S-(1,3,3-trimethoxypropyl) phosphorothiolothionate having the formula:

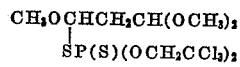

6. As a composition of matter, O,O-diethyl S-(1-methoxy-3,3-diethoxypropyl) phosphorothiolothionate having the formula:

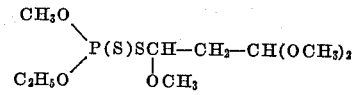

References Cited in the file of this patent
UNITED STATES PATENTS

| | | |
|---|---|---|
| 2,565,920 | Hook et al. | Aug. 28, 1951 |
| 2,586,655 | Hook et al. | Feb. 18, 1952 |

FOREIGN PATENTS

| | | |
|---|---|---|
| 311,106 | Switzerland | Jan. 31, 1956 |
| 311,463 | Switzerland | Jan. 31, 1956 |